United States Patent [19]
Steiner

[11] Patent Number: 5,054,970
[45] Date of Patent: Oct. 8, 1991

[54] BORING HEAD WITH A PAIR OF AXIALLY AND RADIALLY INDIVIDUALLY ADJUSTABLE CUTTING ELEMENTS

[75] Inventor: Rudolph Steiner, Fairport, N.Y.
[73] Assignee: Parlec, Inc., Fairport, N.Y.
[21] Appl. No.: 660,394
[22] Filed: Feb. 25, 1991
[51] Int. Cl.$^5$ .............................................. B23B 29/03
[52] U.S. Cl. ..................................... 408/146; 407/39; 408/153; 408/181; 408/190
[58] Field of Search ........ 408/146, 153, 173, 181–183, 408/185, 147, 190, 198, 157; 407/36–39, 44, 45, 73, 75–77, 79, 88

[56] References Cited
U.S. PATENT DOCUMENTS

| | | | |
|---|---|---|---|
| 3,782,849 | 1/1974 | Mizoguchi | 408/146 X |
| 4,231,691 | 11/1980 | Pape et al. | 408/190 X |
| 4,761,102 | 8/1988 | Pfalzgraf | 408/173 X |
| 4,784,536 | 11/1988 | Pfalzgraf | 279/8 X |

Primary Examiner—Steven C. Bishop
Attorney, Agent, or Firm—Shlesinger, Fitzsimmons & Shlesinger

[57] ABSTRACT

A boring head with a longitudinal axis includes a leading cutting portion and a trailing portion. A pair of adjustable work engagement devices are releasably secured to the leading portion by individual fasteners. Individual mechanisms for adjusting the position of each of the work engagement devices in a first direction generally parallel to the longitudinal axis of the boring head, and individual mechanisms for adjusting the position of each of the work engagement devices in a second direction, generally transverse to the first direction, are provided. The first and second direction adjusting mechanisms are positioned coaxially of each other in the boring head. Each work engagement device is adjustable in the first and second directions individually and independently of the other.

15 Claims, 2 Drawing Sheets

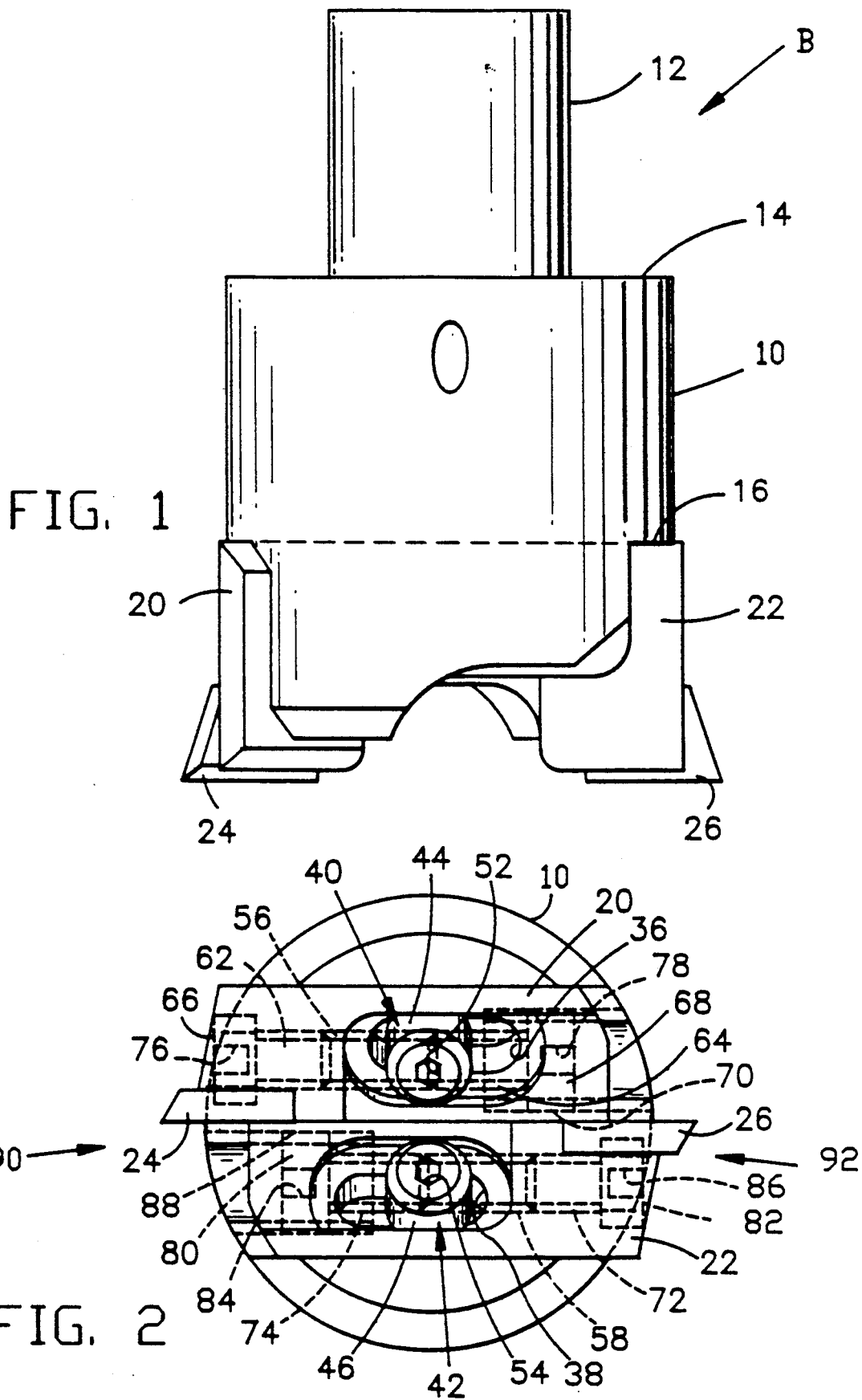

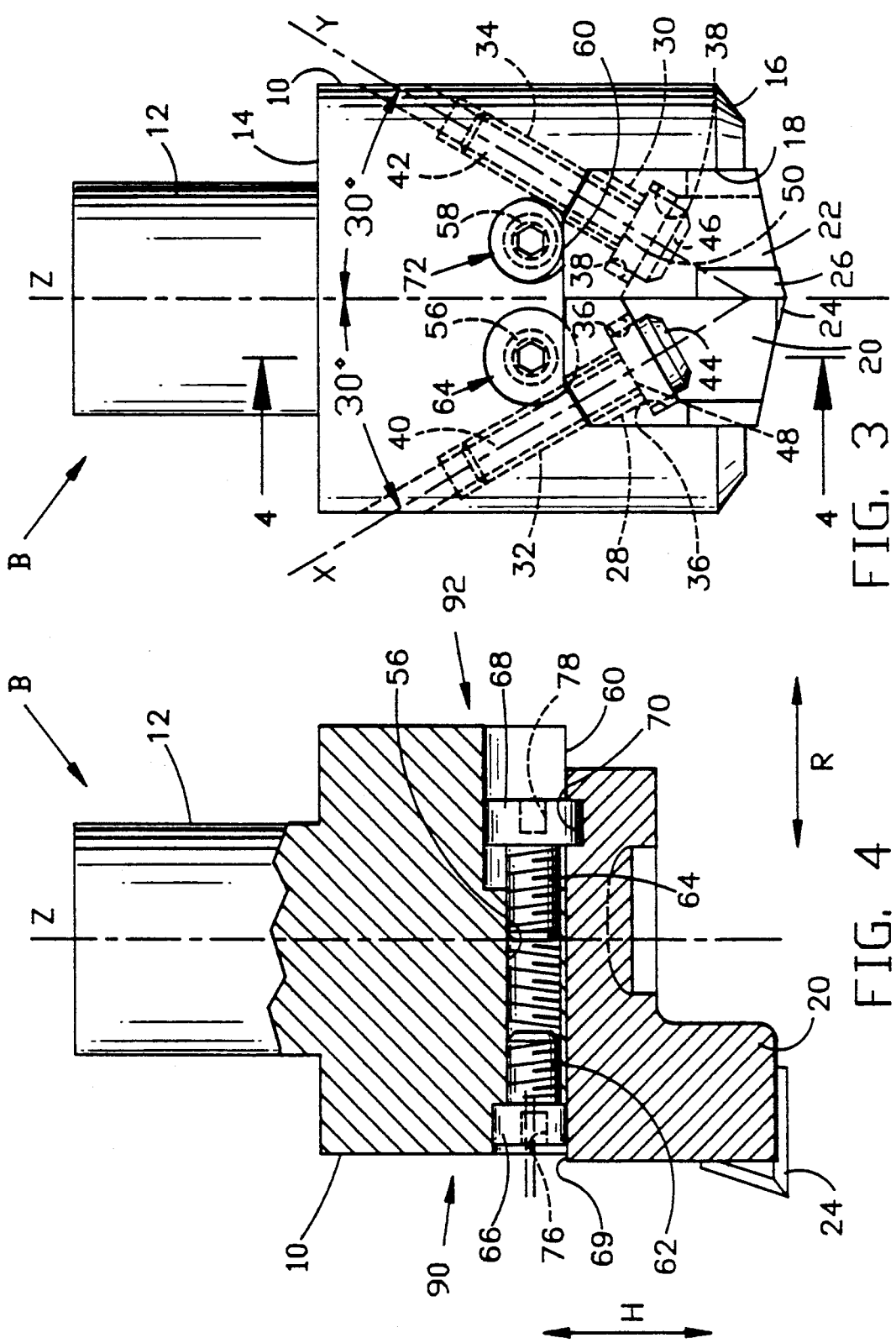

BORING HEAD WITH A PAIR OF AXIALLY AND RADIALLY INDIVIDUALLY ADJUSTABLE CUTTING ELEMENTS

FIELD AND HISTORICAL BACKGROUND OF THE INVENTION

The present invention is directed to boring heads, and more particularly to a boring head including a pair of cutting element holders that are individually and independently adjustable along the longitudinal as well as the radial axis of the boring head.

Various boring heads have been devised in the art. Currently available boring heads suffer from various disadvantages, however, in that their cutting element holders are not axially and radially individually adjustable. An illustrative example of such boring head is disclosed in U.S. Pat. No. 4,231,691 to Pape et al. In this tool, a pair of cutting blade holders are mounted in a transverse slot in the leading face thereof by a single set-screw. When it is desired to make an adjustment in the position of the blade holders, the set-screw is loosened and after making the adjustment, it is tightened to fix the position of the blade holders in the transverse slot.

However, if it is desired to make an adjustment in the position of only one of the blade holders, the set-screw holding both the blade holders, must be loosened and tightened. The loosening and tightening of the single set-screw runs the risk of inadvertently changing the position of both the cutting blade holders, when only a change in the position of only one cutting blade holder is desired. In other words, since a single screw secures both the blade holders on the boring head, it requires extra precaution on the part of the operator to make certain that no change in the position of one blade holder has occurred, while making a change in the position of the other blade holder.

Further, conventional boring heads do not provide accurate axial (height) adjustment of the cutting element holders as the height adjustment mechanism is provided in the cutting elements themselves which translate toward and away from the outer edges of the boring head. For example, when the cutting element holders are positioned adjacent their radial innermost positions, the height adjustment screws are too close to the axial centerline of the boring head, and their movements therefore have very little impact on their associated cutting blade holders. Therefore, these boring heads do not have reliable adjusting mechanisms for the cutting element holders.

In view of the disadvantages associated with the conventional boring heads, there is a need in the art for a boring head in which the cutting element holders are individually and independently adjustable.

OBJECTS AND SUMMARY OF THE INVENTION

The principal object of the present invention is to provide a boring head in which the cutting element holders are individually and independently adjustable along axial and radial axes thereof.

Another object of the present invention is to provide a boring head in which the height or axial direction adjustment mechanisms are positioned in the boring head to obtain a more positive displacement of the cutting element holders regardless of the position thereof in relation to the central longitudinal axes of the boring head.

Yet another object of the present invention is to provide a boring head in which a positive displacement of the cutting element holders is obtained along axial and radial directions.

An additional object of the present invention is to provide a boring head which is simple in construction and allows fine adjustment in the position of the cutting element holders.

An additional object of the present invention is to provide a boring head which provides for fast, easy and accurate radial and axial adjustment in the position of the cutting element holders.

In summary, the main object of the present invention is to provide a boring head which allows for fast and accurate adjustment in the position of the cutting element holders in axial and radial directions, individually and independently of each other.

BRIEF DESCRIPTION OF THE DRAWINGS

The above and other objects, advantages and novel features of the present invention will become apparent from the following detailed description of the preferred embodiment of the invention, illustrated in accompanying drawings, wherein:

FIG. 1 is a side elevational view of the boring head in accordance with the present invention;

FIG. 2 is a bottom plan view thereof;

FIG. 3 is another side elevational view thereof, rotated 90°; and

FIG. 4 is a partial sectional view taken along line 4—4 of FIG. 3.

DETAILED DESCRIPTION OF THE INVENTION

The boring head B of the present invention, as best shown in FIGS. 1 and 3, includes body section 10 with a smaller diameter portion 12 for mounting into the chuck or tool holder on the end of a rotatably driven spindle of a boring machine or the like (not shown). The body section 10 has trailing end 14 and leading end 16. A transversely or radially extending axial groove 18 is provided in leading end 16 for slidably receiving cutting element holders 20 and 22 on the ends of which are mounted cutting blade or inserts 24 and 26, respectively. The cutting blades 24 and 26 are made of a conventional material, such as hardened tool steel, tungsten carbide or the like, and are mounted on respective holders 20 and 22 by standard conventional means.

As best shown in FIG. 3, cutting element holders 20 and 22 include angularly oriented bores 28 and 30, respectively, which are in alignment with corresponding screw-threaded bores 32 and 34 in body section 10. The bores 28 and 32 extend along axis x, which is inclined outwardly preferably at an angle of about 30 relative to the longitudinal axis z of head B. Likewise, bores 30 and 34 extend along axis y which is also oriented outwardly at an angle of about 30° from axis z of the boring head. In this manner, the bores 28, 32 and 30, 34 are angularly outwardly oriented from the leading end 16 to the trailing end 14.

The bores 28 and 30 open into generally oblong-shaped lost-motion slots 36 and 38, respectively, that extend radially and transversely of the boring head axis z, shown in FIG. 2. Mounting screws 40 and 42 with heads 44 and 46, respectively, are provided for securing cutting element holders 20 and 22, individually and independently of each other in groove 18. When properly installed, heads 44 and 46 of the mounting screws 40 and 42 abut inclined surfaces 48 and 50, respectively, of the lost-motion slots 36 and 38, shown in FIG. 3. The recesses 52 and 54 are provided in screw-heads 44 and 46, respectively, for inserting an Allen wrench or the like for loosening or tightening mounting screws 40 and 42.

As described below in detail, each of the cutting element holders 20 and 22, includes a mechanism for adjusting its position along axis z as well as along a direction transverse thereto.

As best shown in FIG. 3, the body 10 includes screw-threaded bores 56 and 58 disposed slightly above roof 60 of groove 18. The bores 56 and 58 extend transversely of axis z and parallel to each other in a side-by-side relationship. The bore 56 accommodates therein the mechanism for adjusting the axial and radial positions of element holder 20, while bore 58 accommodates the similar adjusting mechanism for element holder 22.

As best shown in FIG. 4, axial position or height adjustment screw 62 and radial position screw 64 are coaxially received in bore 56, in a manner that the heads 66 and 68 thereof face in axially opposite directions. The head 66 is mounted eccentrically on the screw 62 and functions as a cam against upper surface 69 of element holder 20. As would be clear to one of ordinary skill in the art that when head 66, which abuts surface 69, is rotated, element holder 20 will be displaced vertically along axis z, as shown by directional arrow H. The head 68 of screw 64, on the other hand, is received in slot 70 in element holder 20. Likewise, it would be apparent to those of ordinary skill in the art that when screw 64 is caused to be rotated, the element holder 20 will traverse in a direction transverse to axis z, as shown by directional arrow R in FIG. 4.

Similar to bore 56, bore 58 has received therein axial position or height adjustment screw 72 and radial position adjustment screw 74 for adjusting the position of holder 22 relative to axis z. The screw-head 66 and 68 are provided with slots 76 and 78, respectively. Likewise, screw-heads 80 and 82 of screws 74 and 72 are also provided with slots 84 and 86, respectively. It should be noted that like screw-head 66, screw-head 82 is also mounted eccentrically on screw 72. And like screw-head 68, screw-head 80 is received in a slot 88 in element holder 22. The positions of screws 62 and 64 can therefore be said to be in diametrically opposed relationship to the screws 72 and 74 (FIG. 2). Accordingly, axial position adjustment screw 62 lies in a side-by-side relationship to radial position adjustment screw 74 on one side 90 of boring head B. Likewise, radial position adjustment screw 64 lies in a side-by-side relationship to axial position adjustment screw 72 on side 92, lying opposite to the side 90 (FIGS. 2 and 4).

USE AND OPERATION

When it is desired to change or adjust the position of, for example, cutting element holder 20, mounting screw 40 is loosened and screw 62 and/or 64 are rotated to adjust the position in an axial and/or radial direction, respectively. Likewise, the adjustment in axial and/or radial position of element holder 22 can be made by first loosening mounting screw 42 and then rotating screws 72 and 74. Therefore, if there is a need to make an adjustment in the position of only one of the holders 20 and 2, only the corresponding mounting screw 40 or 42 needs to be loosened. In this manner, the position of the other cutting element holder is kept undisturbed, and the operator need not be concerned about inadvertently changing the position of one cutting element holder while adjusting the position of another.

While this invention has been described as having a preferred design, it is understood that it is capable of further modifications, uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or the limits of the claims appended hereto.

What I claim is:

1. A boring head device for boring or finishing a hole or the like in a workpiece, comprising:
   a) a boring head having a leading cutting portion and a trailing portion;
   b) said boring head having a longitudinal axis;
   c) first and second adjustable work engagement means releasably secured to said leading portion by individual fastening means;
   d) means for individually adjusting the position of each of said pair of work engagement means in a first direction generally parallel to said longitudinal axis of said boring head;
   e) means for individually adjusting the position of each of said pair of work engagement means in a second direction generally transverse to said first direction; and
   f) said first and second direction adjusting means being positioned coaxially of each other in said boring head;
   g) whereby each of said pair of work engagement means is adjustable in said first and second directions, independently of the other of said pair of work engagement means.

2. The boring head device of claim 1, wherein: boring head includes first and second
   a) said boring head includes first and second laterally spaced screw-threaded bores having axes extending generally transverse to said longitudinal axis thereof; and
   b) said first and second direction adjusting means for a first of said pair of work engagement means are received in said first bore; and
   c) said first and second direction adjusting means for a second of said pair of work engagement means are received in said second bore.

3. The boring head device of claim 2, wherein;
   a) said first and second direction adjusting means for said first work engagement means comprise first and second set-screws, respectively.

4. The boring head device of claim 3, wherein:
   a) said first set-screw includes a head portion eccentrically mounted on a shank portion; and
   b) said shank portion is in operative engagement with said first work engagement means for a selective displacement thereof along said longitudinal axis of said boring head.

5. The boring head device of claim 4, wherein:
   a) said first work engagement means includes a first slot; and
   b) said second set-screw includes a head portion rotatably received in said first slot;
   c) said first and second set-screw heads face in diametrically opposite directions; and d) wherein a rotation of said head portion of said second set-screw will cause said first work engagement means to be displaced in a direction transverse to said longitudinal axis of said boring head.

6. The boring head device of claim 5, wherein:
a) said first and second direction adjusting means for said second work engagement means comprise third and fourth set-screws, respectively.

7. The boring head device of claim 6, wherein:
a) said third set-screw includes a head portion eccentrically mounted on a shank portion; and
b) said shank portion of said third set-screw is in operative engagement with said second work engagement means for a selective displacement thereof along said longitudinal axis of said boring head.

8. The boring head of claim 7, wherein:
a) said second work engagement means includes a second slot;
b) said fourth set-screw includes a head portion rotatably received in said second slot;
c) said third and fourth screw-heads face in diametrically opposite directions;
d) said first and fourth screws lie in a side-by-side relationship on a first side of said boring head and said third and fourth screws lie on a side-by-side relationship on another side diametrically to said first side thereof; and
e) wherein a rotation of said head portion of said fourth set-screw will cause said second work engagement means to be displaced in a direction transverse to said longitudinal axis of said boring head.

9. The boring head device of claim 2, wherein:
a) each of said fastening means includes a slot in said boring head; and
b) each of said slots has an axis inclined at an angle relative to said longitudinal axis of said boring head.

10. The boring head device of claim 9, wherein:
a) said slot axes extend away from each other from said leading portion to said trailing portion of said boring head.

11. The boring head device of claim 9, wherein:
a) said slot axes extend in a first plane;
b) said first and second bore axes extend in a second plane intersecting said first plane at a right angle.

12. The boring head device of claim 9, wherein:
a) said first and second bore axes extend between and transverse to said slot axes.

13. The boring head device of claim 9, wherein:
a) at least one of said slot axes is inclined at an angle of about 30° relative to said longitudinal axis of said boring head.

14. The boring head device of claim 9, wherein:
a) each of said fastening means further includes an individual set-screw received in corresponding first and second work engagement means; and
b) said set-screws include shank portions to be received in the corresponding slots in said boring head for removably securing said first and second work engagement means thereto.

15. The boring head device of claim 14, wherein:
a) each of said first and second work engagement means includes an elongated slot extending along the length thereof and having an inclined surface; and
b) said set-screws include head portions slidably abutting the corresponding inclined surface.

* * * * *